July 8, 1958 — C. F. CARLSON — 2,842,456
PROCESS FOR DEVELOPING AN ELECTROSTATIC IMAGE
Filed Aug. 30, 1955 — 2 Sheets-Sheet 1

INVENTOR.
CHESTER F. CARLSON
BY Frank A. Steinhilber
ATTORNEY

July 8, 1958      C. F. CARLSON      2,842,456
PROCESS FOR DEVELOPING AN ELECTROSTATIC IMAGE
Filed Aug. 30, 1955      2 Sheets-Sheet 2

INVENTOR.
CHESTER F. CARLSON
BY Frank A. Steinhilper
ATTORNEY

United States Patent Office

2,842,456
Patented July 8, 1958

2,842,456

PROCESS FOR DEVELOPING AN ELECTROSTATIC IMAGE

Chester F. Carlson, Pittsford, N. Y., assignor to The Battelle Development Corporation, Columbus, Ohio, a corporation of Delaware Application August 30, 1955, Serial No. 531,473

1 Claim. (Cl. 117—17.5)

This invention relates to an apparatus for the development of electrostatic latent images and a process therefor.

In xerography it is usual to form an electrostatic latent image on an insulating surface. One method of doing this is to charge a photoconductive insulating surface and then dissipate the charge selectively by exposure to a pattern of activating radiation. Other means of forming the electrostatic latent images are set forth in U. S. 2,647,464 to James P. Ebert. Whether formed by these means or any other, the resulting electrostatic charge pattern is conventionally utilized by the deposition of an electroscopic material thereon through electrostatic attraction, whereby there is formed a visible image of electroscopic particles corresponding to the electrostatic latent image. Alternatively, the electrostatic charge pattern may be transferred to an insulating film and the electroscopic particles deposited thereon to form the visible image. In any case, this visible image in turn may be transferred to a second surface to form a xerographic plate.

The process of depositing the electroscopic powder on the electrostatic image to render the electrostatic image visible is called "the development step" and is one of the most critical steps of the entire process. The step is of particular importance both on machines designed for continuous operation with any type of copy and in processing continuous tone images. Now, in accordance with the present invention, an apparatus and process therefor is provided for substantially improved development of an electrostatic latent image.

Fig. 1 of the attached drawings is a block diagram showing the position of the development step in an overall xerographic process which results in a visible image.

Figure 1:
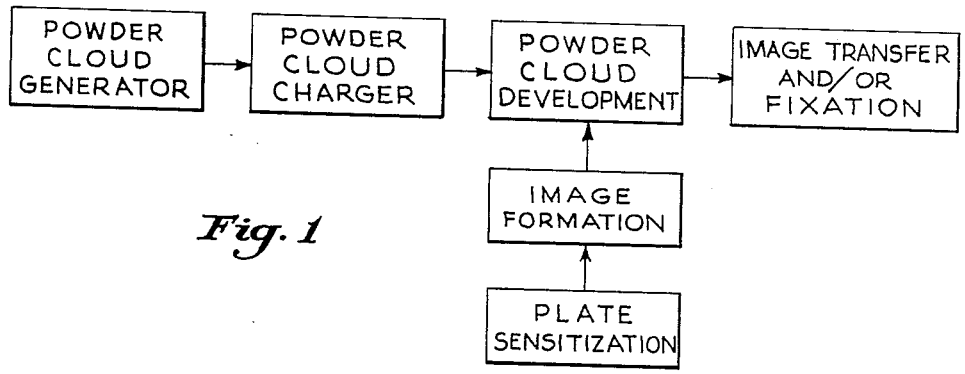

As shown in Fig. 1, the general xerographic process involves the formation of an electrostatic latent image. This is generally, although not always, preceded by a treatment to sensitize the surface on which the electrostatic latent image is to be formed. The electrostatic latent image, to be useful, must then be rendered visible, which is done in a development step. This is accomplished by depositing electroscopic particles either on the surface on which the image was formed or on an insulating surface to which the electrostatic latent image has been transferred.

It is evident that no picture can be better than its development step permits. About the coarsest type of image reproduced by a xerographic process requires a resolution of at least about 50 lines per inch. Commercial line copying machines generally have a resolution power of about 125 to 250 lines per inch. The process used in obtaining this resolution is set forth in U. S. 2,618,552, and involves the use of a finely divided material called a "toner" deposited on a slightly more coarsely divided material called a "carrier." This two-component developer is cascaded across the electrostatic latent image areas. The control of the concentration of toner in the two-component developer becomes extremely difficult in the continuous operation of such line copy machines. When applied to continuous tone development where resolutions of about 1200 or more lines per inch are often desired, it has been found impossible to obtain this high quality of reproduction with such a system. Accordingly, a system known as "powder cloud development" is preferred. This is the system incorporated in Fig. 1.

As shown in Fig. 1, the powder cloud is generated as from a dry material or by forming a spray of liquid droplets. The cloud so produced is then charged, the charging step constituting either a separate step or utilizing the inherent charge on the cloud, in the case of a cloud of dry particles. A cloud so generated and charged is then contacted with the electrostatic latent image in the development step. The visible image so produced may be used as such, permanently affixed to the plate, or may be transferred to other material as a sheet of paper or plastic and affixed thereto, as is well known to those skilled in the xerographic art.

While it is possible to obtain a high quality of tonal reproduction using powder cloud development, the various processes for developing electrostatic images with powder cloud differ widely in their characteristics, such as susceptibility to streaking, tearing, halo, graininess, evenness of development from side to side and end to end, speed of development, crispness of whites, etc. Electrostatic images developed using the apparatus of this invention are characterized by exceptional freedom from defects such as those just mentioned, and are particularly outstanding in the reduction of unwanted deposition in background areas, i. e., the crispness of the white areas.

In addition, images developed with the present apparatus show little susceptibility to several of the defects which characterize many other powder cloud development processes. For example, in some processes, when the powder cloud in its flow travels over an area that should be dark, a leading edge of the dark area is not developed. On the developed image, the dark area appears to be torn so that a white background shows through. Because of this appearance, the flaw is referred to as "tearing."

Another defect occurs when the powder cloud travels over a large dark area and then over a large area that should remain white. Although the white area is void of charge, it does not remain free of powder. Developer particles deposit in streaks through this area in amounts roughly proportional to the length of the dark area that immediately precedes the white area. This defect is termed "streaking."

Again, the developer powder is deposited relatively uniformly over a charged area, but along the dividing line between the charged and uncharged areas there is a pronounced absence of deposited powder. This defect is termed "halo."

Finally, in background areas which should be completely discharged by the intensity of the incident light and thus appear as white areas on the developed image, nevertheless it is generally noted that there is some deposition of powder particles. This defect is generally termed "deposition in background areas."

Images developed according to the instant invention are relatively free of these defects and are characterized furthermore by exceptional evenness both from side to side and particularly from end to end, even in the case of exceptionally large image areas. As another advantage, development time using the instant invention is relatively short, a few seconds being sufficient for complete development.

Apparatus according to this invention for developing an electrostatic image comprises a cloud generator, a gas supply, a charging device for the cloud particles, a development electrode, support means to receive and support an electrostatic image-bearing member adjacent to the development electrode and closely spaced therefrom at a distance of no more than 1/8 inch thereby defining a development zone relative to the development electrode, a first entrance chamber extending across one end of the electrode and extending therethrough to terminate in an entrance slot into the development zone, means to feed the charged cloud particles into the entrance chamber, the entrance chamber being sloped so that the cloud particles pass through the development zone in substantially laminar flow parallel to the development electrode, a second entrance chamber extending across the same end of the electrode as the first entrance chamber and extending therethrough to terminate in an entrance slot parallel to the first entrance slot and spaced therefrom away from the development zone, means to flow gas into the second entrance chamber being sloped so that the gas passes through the development zone in substantially laminar flow parallel to the development electrode, an exit means at the opposite end of the development electrode from the end containing the entrance slots.

A xerographic plate is customarily used in this apparatus to supply the image bearing surface. A xerographic plate consists of a conductive backing member and a photoconductive insulating coating or layer thereon. If desired, a protective coating or layer may be applied covering and protecting at least the photoconductive insulating layer. The backing member is a suitable conductive material such as, for example, a metallic member, plate, or the like, as of brass, aluminum, zinc, etc., or optionally a nonconductive member of desired structural properties such as glass having a conductive coating as of tin oxide, or a fibrous material such as paper having therein conductive material such as water, particles of carbon, metal or the like rendering the material conductive. On this backing member is a photoconductive insulating layer which is one of suitable materials including vitreous selenium and tellurium, various photoconductive phosphors such as zinc oxide, cadmium sulfide, or the like, either as a continuous layer or as discreet particles in a resinous binder. If desired, protective coating may be applied of any resin which is transparent to the radiation used and has good insulating properties. Suitable materials are polyvinyl resins such as polystyrene, polyvinyl acetate, polyvinyl chloride; silicon resins; cellulose esters and ethers; and acrylic resins. Such a plate may be sensitized, i. e. made light-sensitive, by depositing an electrical charge, as by corona discharge or other means, on the photoconductive insulating material.

While a preferred embodiment of the invention is described herein, it is contemplated that considerable variation may be made in the method or procedure and the construction of parts without departing from the spirit of the invention. In the following description and in the claims, parts will be identified by specific names for convenience, but they are intended to be as generic in their application to similar parts as the art will permit.

Figure 2:
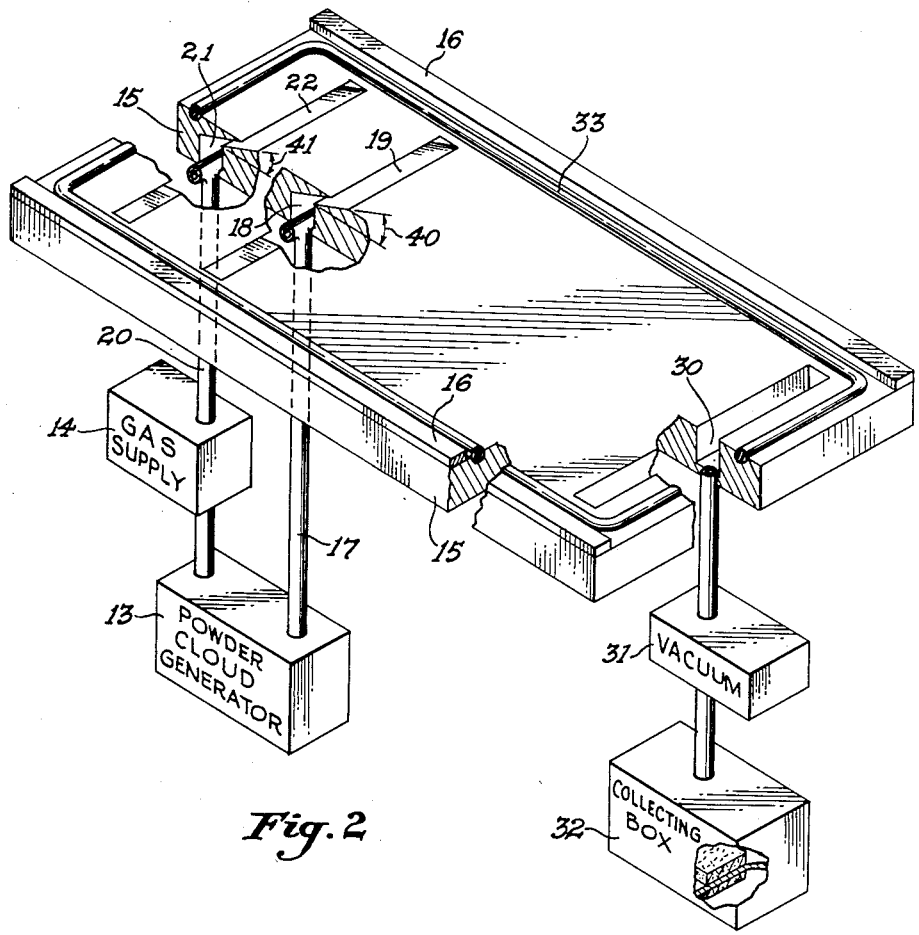
Fig. 2 is an isometric drawing of apparatus according to one embodiment of the invention.
Figure 3:
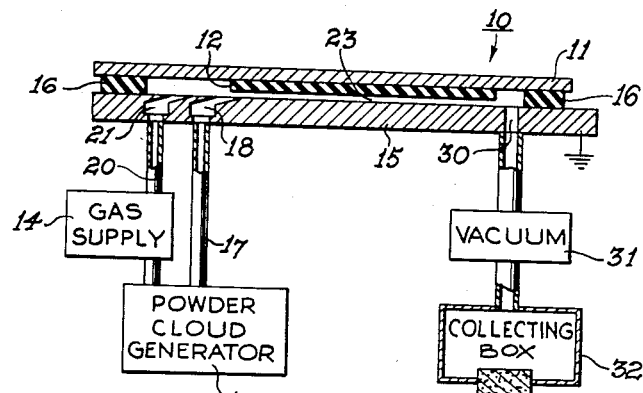
Fig. 3 is a cross section of this embodiment.

Referring to the drawings, Figures 2 and 3 illustrate a powder cloud generator 13 with conduit 17 serving both as means to convey the powder cloud from the powder cloud generator 13 to the entrance chamber 18 and as means to charge the powder cloud triboelectrically through contact between the cloud particles and the walls of the conduit 17. The entrance chamber 18 extends across the one end of the development electrode 15 and terminates in its upper side in an entrance slot 19. The gas supply 14 is connected to the second entrance chamber 21 by conduit 20. The second entrance chamber 21 extends across the same end of the development electrode 15 as the first entrance chamber 18 and terminates in an entrance slot 22. Entrance slots 19 and 22 are parallel to each other and extend across the same end of the development electrode. The entrance slot 22 for the second entrance chamber 21 is spaced from the first entrance slot 19 and away from the development zone 23. At the opposite end of the development electrode 15 from the entrance slots 19 and 22 are exit means 30 which may be either holes or a slot. Exit means 30 may, in turn, be connected to a collecting box 32 which in turn is activated by vacuum means 31.

On the development electrode 15 are spacers 16 which hold an image-bearing member such as a xerographic plate 10 at the desired space which should be no more than 1/8 inch. If it is desired to place a varying potential on the development electrode 15 as hereafter described more fully, spacers 16 should be constructed of insulating material to electrically insulate the conductive backing material 11 of the xerographic plate 10 from the development electrode 15. Then, a ground connection is provided for either the conductive backing member 11 or the development electrode 15 and the desired D. C. potential placed on the ungrounded member. In the embodiment shown, both the development electrode and the conductive backing 11 are maintained at ground potential. In this embodiment, then, the spacers 16 are constructed of conductive material so that the single ground connection shown for the development electrode also serves to place the conductive backing member 11 at ground potential. The development zone 23 is defined as the space between the photoconductive insulating layer 12 and the development electrode 15. A rubber gasket 33 acts as a dust seal. Development proceeds as follows:

A xerographic plate bearing an electrostatic latent image is placed on the spacers 16 and secured by suitable means not shown, such as clamps, pins, etc. The gas supply is then actuated causing a gas, such as air, to flow through conduit 20 to entrance chamber 21 emerging into the development zone 23 through entrance slot 22. The entrance chamber 21 is so sloped that the gas emerges from 22 in substantially laminar flow and forms a thin, relatively fast-moving layer of gas along the surface of the photoconductive insulator 12.

A cloud of electroscopic particles is generated in the cloud-forming device 13, for example, by the agitation of a powder mass in a closed container with a rotating brush as shown by U. S. 2,357,809 to C. F. Carlson or a rotating air mass as caused by laterally rotating nozzles or by aspirated air from a powder-loaded belt or disc. If a cloud of liquid droplets is desired, it may be produced by any means known to those skilled in the art, as by spraying through an aspirator as shown in U. S. 2,690,394 to C. F. Carlson.

The cloud, by whatever means produced, is then charged. Where a cloud of dry particles is used, any method of generating the cloud will almost necessarily produce a charge thereon. For some purposes the charge so produced will be adequate. If it is desired to produce a more uniform charge, however, other devices, such as triboelectric charging, as by passing the electroscopic powder through a narrow tube of suitable material in turbulent flow, corona charging, or other device may be used. In the case of a cloud of liquid droplets, charging means such as induction charging as shown in U. S. 2,690,394 to C. F. Carlson, corona charging, etc. may be used. In the instant embodiment, conduit 17 charges the powder cloud triboelectrically, and conveys the charged powder cloud to entrance chamber 18.

The entrance chamber 18 may desirably have a larger cross section area than the input tube or tubes which admit the powder cloud. The entrance chamber terminates in entrance slot 19. The entrance chamber 18 is sloped so that the cloud emerges from the entrance slot 19 into the development zone 23 in laminar flow approximately parallel to the image-bearing surface 12. The cloud particles do not directly impinge on the image-bearing surface 12 because of the protective sheath of gas supplied from entrance slot 22.

In the development zone, the development electrode draws the field of force of the electrostatic image externally from the image-bearing surface. To do this, the electrode may be grounded, as shown, or may be charged to a polarity opposite to that of the image as explained hereafter and in any event can be no more than 1/8 inch from the image-bearing surface. For xerographs requiring a high degree of resolution, the distance between the electrode and the image-bearing surface should be no more than 1/40 inch. The external electric field attracts the charged powder particles drawing them through the layer of gas causing them to deposit on the charged areas of the photoconductive insulator 12. The powder cloud passes through this field of force in the development zone, the unused portion leaving through exhaust means 30.

As a result of this process, the electroscopic particles are deposited on the image areas of the xerographic plate from the powder cloud. At the same time, due to the protective action of the sheath of gas, deposition is limited to charged areas, thereby making the white portions of the print much whiter than otherwise. In addition, heavy particles, termed "agglomerates," cannot move as easily through the protective sheath of gas to deposit on the image surface. This gives a less grainy print.

In the unit shown, the entrance chamber 18 is sloped to make an angle 40 with the top surface of the development electrode of 5 degrees, while the entrance chamber 21 is sloped to make an angle 41 with the top surface of the development electrode of 10 degrees. In the apparatus shown where the development zone was about 4 inches wide by 5 inches long with the development electrode 15 spaced about 0.015 inch from the surface of the xerographic plate, the rate of flow through the development zone 23 is 1½ to 2 C. F. M. free flow. The images so developed may be used as such, permanently affixed to the plate, or may be transferred to another material, as a sheet of paper or plastic, and permanently affixed thereto as is well-known to those skilled in the xerographic art.

Figure 4:
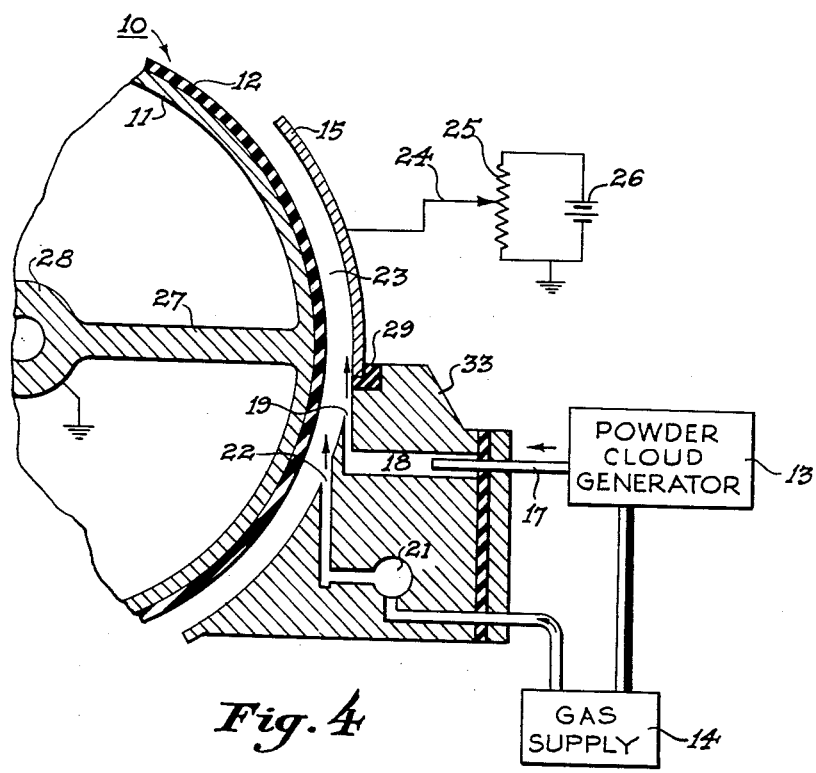
Fig. 4 is a semi-diagrammatic drawing in cross section of apparatus according to another embodiment of the invention.

Apparatus according to another embodiment of the invention is shown in Fig. 4. In this case, the xerographic plate 10 is in the form of a cylindrical drum and consists of a layer of photoconductive material 12, as selenium, coated on a conductive backing 11, such as aluminum. Radial arms 27 of conductive material support the surface of the drum 11 and connect it to axis 28 which is grounded. As the drum revolves about the axis 28 the various operations of the overall xerographic process, as shown in Fig. 1, i. e. sensitization, exposure, development, transfer, and cleaning, are carried out around the periphery of the drum. Thus, this embodiment is particularly adapted for continuous operation.

Fig. 4 shows the section of the drum where development takes place. The apparatus and its manner of operation are much the same as for the apparatus shown in Figs. 2 and 3. The powder cloud generator feeds the powder cloud through capillary tubes 17 into entrance chamber 18. Triboelectric contact charges the powder particles in their passage through capillaries 17. Entrance chamber 18 has a considerably larger volume than the capillaries 17. This acts as a reservoir to smooth out minor fluctuations in powder cloud flow. Gas from gas supply 14 flows through conduit 20 to entrance chamber 21 which, like entrance chamber 18, also serves as a reservoir to smooth out minor fluctuations in flow. The gas emerges from entrance chamber 21 by means of entrance slot 22 into development zone 23 in substantially laminar flow to form a protective sheath or layer of gas adjacent to the photoconductive surface 12. The powder cloud similarly emerges from entrance chamber 18 through entrance slot 19 into development zone 23 in substantially laminar flow tangential to the photoconductive surface 12.

Development electrode 15 is separated from manifold block 33 by an insulating spacer 29. Contact 24 connects the development electrode 15 to potentiometer 25. The potentiometer 25, in turn, is connected to a source of voltage, as a battery, 26. Moving the contact 24 thus permits varying the potential or bias placed on development electrode 15.

Operation of the device is the same as for the device in Figs. 2 and 3.

Generally, the powder cloud is charged with a charge of polarity opposite to the polarity of the electrostatic image. However, this is not necessarily so. Thus, reversal development may be effected by charging the powder cloud with a charge having the same polarity as the image areas. Hence, the powder is repelled from the image. When a field is applied by the development electrode which opposes the image field, the powder is attracted to the uncharged background areas to develop a reversal print.

Grounding the development electrode is sufficient to draw the lines of force of the images areas externally from the image-bearing surface. However, the development electrode is capable of a far more flexible operation than this. Thus, the quality and character of images can be controlled by placing various potentials on the electrode.

It is often desirable to vary the maximum and minimum density of a print to control the contrast and in some cases, to accentuate the development of areas having a given charge density. To increase the brightness of high lights, a field is applied by the development electrodes which cancels the field from the highlight areas. To increase the overall density a field may be applied to aid deposition of powder over the entire image-bearing surface. To emphasize the darker areas of the image, a potential may be applied to the electrode for, say, 50 percent of the time which opposes the field of the image and sufficient to produce a field strength which will cancel or reverse the field from all except the most highly charged image areas. During this period, only the most highly charged areas are developed. For another period, say 40 percent of the development time, the potential is lowered to permit some devolopment of intermediate tones along with further development of dark areas, and finally, for the last 10 percent of the cycle the potential may be lowered still further to allow a slight fill-in in the lighter areas. Other forms of development can also be achieved with such a system.

I claim:

A process for developing an electrostatic image on an image-bearing surface, said process comprising drawing the field of force of said image externally above the image-bearing surface, blowing a gas over the image-bearing surface in laminar flow to form a layer of rapidly moving gas adjacent to the image-bearing surface, generating and charging a cloud of powder particles, passing the charged powder cloud in approximately laminar flow parallel to the image-bearing surface below the protective layer of gas, and the electrostatic image and drawing the charged powder particles through the protective layer of gas causing the particles to deposit on the image-bearing surface in conformity with the said electrostatic image.

References Cited in the file of this patent

UNITED STATES PATENTS

| | | |
|---|---|---|
| 2,049,940 | Barthel | Aug. 4, 1936 |
| 2,302,289 | Bramston-Cook | Nov. 17, 1942 |
| 2,626,865 | Mayo et al. | Jan. 27, 1953 |
| 2,659,670 | Copley | Nov. 17, 1953 |
| 2,684,902 | May et al. | July 27, 1954 |
| 2,725,304 | Landrigan et al. | Nov. 29, 1955 |

FOREIGN PATENTS

| | | |
|---|---|---|
| 698,994 | Great Britain | Oct. 28, 1943 |